(12) United States Patent
Chambliss et al.

(10) Patent No.: US 8,881,165 B2
(45) Date of Patent: Nov. 4, 2014

(54) METHODS, COMPUTER SYSTEMS, AND PHYSICAL COMPUTER STORAGE MEDIA FOR MANAGING RESOURCES OF A STORAGE SERVER

(75) Inventors: David D. Chambliss, Morgan Hill, CA (US); Lei Liu, Tucson, AZ (US); William G. Sherman, Tucson, AZ (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/534,125

(22) Filed: Jun. 27, 2012

(65) Prior Publication Data

US 2013/0007757 A1    Jan. 3, 2013

Related U.S. Application Data

(63) Continuation of application No. 13/172,648, filed on Jun. 29, 2011, now abandoned.

(51) Int. Cl.
*G06F 9/46* (2006.01)
*G06F 3/06* (2006.01)
*G06F 9/48* (2006.01)
*G06F 17/00* (2006.01)

(52) U.S. Cl.
CPC  *G06F 9/46* (2013.01); *G06F 3/061* (2013.01); *G06F 9/4881* (2013.01); *G06F 17/00* (2013.01)

USPC .............................. 718/104; 718/103; 710/7

(58) Field of Classification Search
CPC .......... G06F 9/4881; G06F 9/50; G06F 3/061
USPC ...................................... 718/103, 104; 710/7
See application file for complete search history.

(56) References Cited

U.S. PATENT DOCUMENTS

| 7,752,622 | B1 * | 7/2010 | Markov ......................... 718/103 |
| 7,757,013 | B1 | 7/2010 | Lawson et al. |
| 7,774,491 | B2 | 8/2010 | Alvarez et al. |
| 8,031,603 | B1 * | 10/2011 | Polk et al. ..................... 370/235 |
| 2004/0225736 | A1 | 11/2004 | Raphael |
| 2007/0226435 | A1 * | 9/2007 | Miller et al. ................... 711/158 |

* cited by examiner

*Primary Examiner* — Camquy Truong
(74) *Attorney, Agent, or Firm* — Griffiths & Seaton PLLC

(57) ABSTRACT

For managing a storage server having improving overall system performance, a first input/output (I/O) request is received. A first priority level is dynamically assigned to the first I/O request, the first I/O request associated with a performance level for an application residing on a host in communication with the storage server. A second I/O request of a second priority level is throttled to allow at least a portion of a predetermined amount of resources previously designated for performing the second I/O request to be re-allocated to performing the first I/O request. The second priority level is different than the first priority level.

21 Claims, 3 Drawing Sheets

METHODS, COMPUTER SYSTEMS, AND PHYSICAL COMPUTER STORAGE MEDIA FOR MANAGING RESOURCES OF A STORAGE SERVER

CROSS-REFERENCE TO RELATED APPLICATIONS

The present application is a Continuation of U.S. patent application Ser. No. 13/172,648, filed on Jun. 29, 2011.

BACKGROUND OF THE INVENTION

1. Field of the Invention

The present invention relates in general to storage servers, and more particularly, to methods, computer systems, and physical computer storage media for managing resources of storage servers.

2. Description of the Related Art

Data processing systems can have many nodes that are geographically dispersed. In such case, the systems can be managed in a distributed manner by logically separating each environment into a series of loosely connected managed regions. Each environment can have a management server for managing local resources, while a management system including management servers coordinate activities across the system to permit remote site management and operation. In this way, local resources within one region can be exported for the use of other regions. The management system can be governed by a service level agreement providing rules for managing the many systems.

In order to fulfill quality-of-service guarantees delineated by the service level agreement within a network management system, performance measurements may be required along various network routes throughout the system. In particular, the management system measures resource consumption while an application is running. Measurements are taken along particular routes and metrics and descriptions relating to operations performed consuming bandwidth are accumulated.

SUMMARY OF THE INVENTION

Different applications may have different quality-of-service requirements delineated by the service level agreement. For instance, some applications may require a faster response time and/or higher input/output throughput than other applications. In other cases, an application may require larger bandwidth or larger storage capacity than another application. In the past, lower priority input/output (IO) requests were throttled based on static mapping between storage requirements and storage service classes of an application. As a result, in some instances, lower priority IO requests would be neglected in favor of high priority IO requests, and the system would become overloaded by the volume of high priority IO requests in a queue. Consequently, system operation was not as efficient as desired and low priority request would be minimally fulfilled. To optimize overall performance of the system, improved methods and systems for managing storage media are needed.

One improved method dynamically assigns priorities to IO requests based on the performance level and importance of the host application which the IO requests belong to, and throttling lower priority IO requests based on 1) a performance level of the high priority IO requests compared with a performance level of the lower priority requests, and 2) relative performance level of the high priority IO requests compared with its performance target, which is defined within the storage class to which the high priority IO requests is currently mapped. In an embodiment, by way of example only, a first IO request is received. Then, a first priority level is dynamically assigned to the first IO request, where the first IO request is associated with a performance level for an application residing on a host in communication with the storage server. A second IO request of a second priority level is throttled, when the performance level of the first IO request does not meet or exceed a first target to allow at least a portion of a predetermined amount of resources previously designated for performing the second IO request to be re-allocated to performing the first IO request, where the second priority level is different than the first priority level.

In another embodiment, by way of example only, a computer system is provided. The computer system includes a host and a storage server. The host is configured to provide input/output (IO) requests. The storage server is in communication with the host and is configured to receive the IO requests. The storage server includes a processor configured to receive a first input/output (IO), to dynamically assign a first priority level to the first IO request, the first IO request having a performance level, and to throttle a second IO request of a second priority level, when the performance level of the first IO request does not meet or exceed a first target to allow at least a portion of a predetermined amount of resources previously designated for performing the second IO request to be re-allocated to performing the first IO request, the second priority level being different than the first priority level.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for managing a storage server that have improved overall system performance. The systems and methods allow dynamic adjustment of storage classes of high and low priority IO requests, based on analyses of performance feedback data associated with those IO requests. Generally, the method includes receiving a first input/output (IO) request, where the first IO request is associated with a performance level and a first priority level for an application residing on a host in communication with the storage server. A second IO request of a second priority level is throttled, when the performance level of the first IO request does not meet or exceed a first target to allow at least a portion of a predetermined amount of resources previously designated for performing the second IO request to be re-allocated to performing the first IO request, where the second priority level is different than the first priority level.

Figure 1:
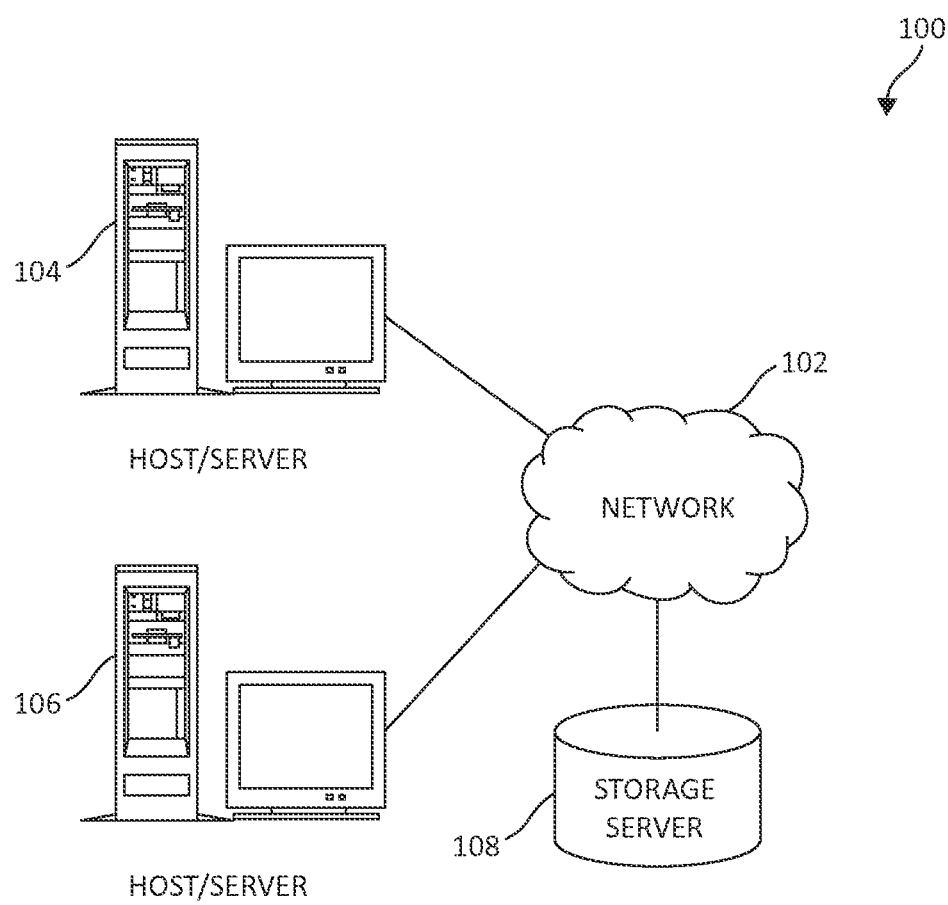
FIG. 1 is a pictorial representation of an example distributed data processing system, according to an embodiment.
Figure 2:
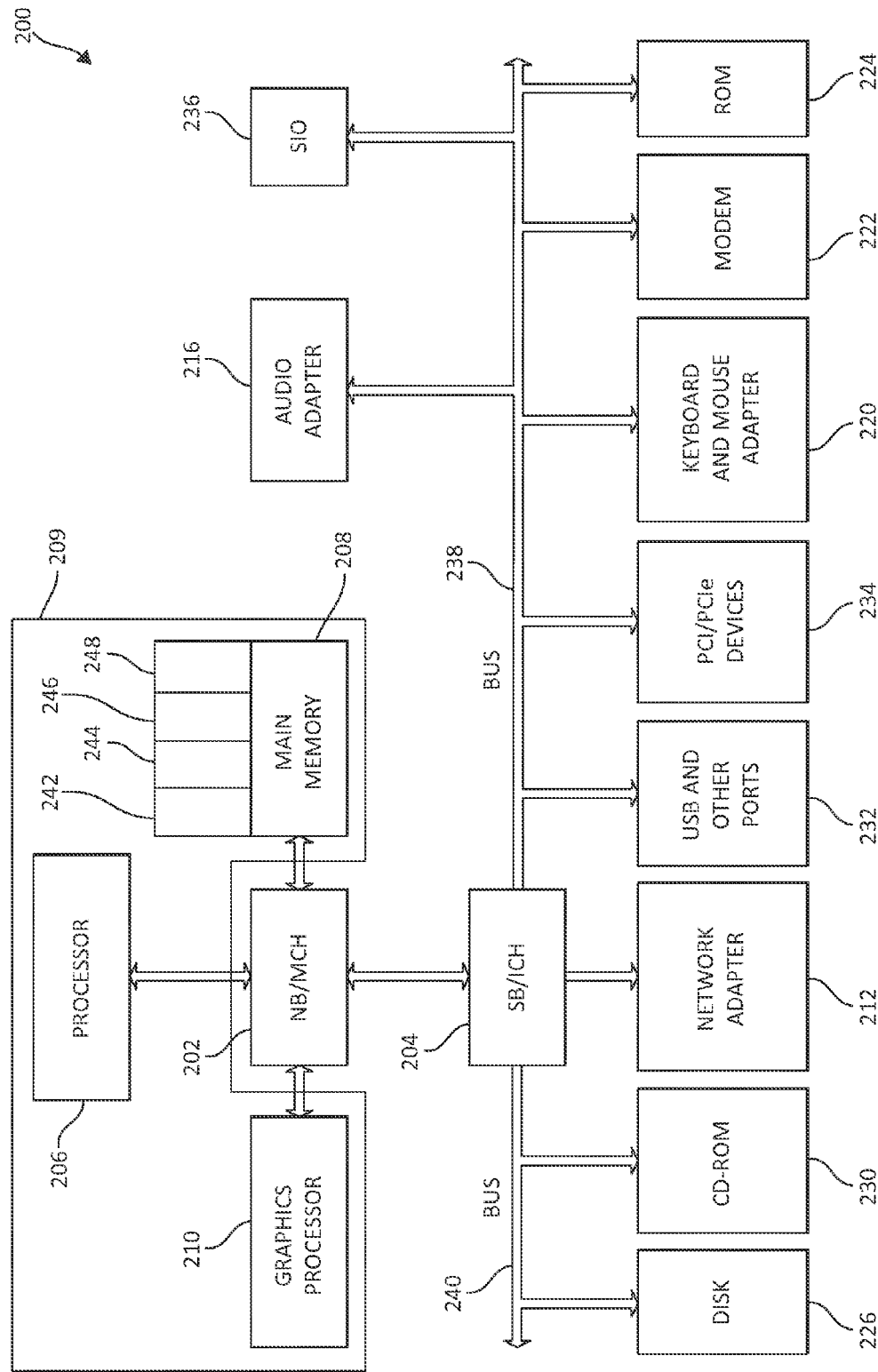
FIG. 2 is a block diagram of an example data processing system, according to an embodiment.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, host/server 104 and host/server 106 are connected to network 102 along with storage server 108. One or both of the host/servers 104, 106 are application servers and include a storage controller 109, 111 that is configured to control storage and access of data stored on the storage server 108. In this regard, the host/servers 104, 106 are configured to provide input/output ("IO") requests to the storage server 108. In an embodiment, the host/servers 104, 106 assign priority levels and performance levels to the IO requests. For example, the priority level of an IO request can range from a high priority, a medium priority, or a low priority. Thus, one IO request can have a higher or lower priority level than another IO request. As used herein, the performance level can be set at a target and can be measured numerically or qualitatively.

Storage server 108 may be include a storage unit and can comprise any storage system. Examples of storage server 108 may include an advanced storage device, such as a DS8000 dual node controller, or a file server, such as a network attached storage (NAS) device. Although two host/servers 104, 106 are shown, more or fewer can be included in other embodiments. Distributed data processing system 100 may include additional servers, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. The illustrative embodiments are also particularly well suited for implementation with networks, such as SANs, where the wires and switches utilize Fibre Channel, iSCSI, FCOCEE, or the like technologies. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as host/server 104, 106 in FIG. 1, in which computer usable code or instructions implementing the processes for illustrative embodiments of the present invention may be located.

Data processing system 200 includes a controller 209 comprising a processor 206, main memory 208 and, alternatively, a graphics processor 210. The controller 209 supplies commands to run database and/or backup applications to the system 200. In the depicted embodiment, the data processing system 200 employs a hub architecture including north bridge and memory controller hub (NB/MCH) 202 and south bridge and input/output (I/O) controller hub (SB/ICH) 204. Processor 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processor 206. The operating system coordinates and provides control of various components within the data processing system 200 in FIG. 2. As a host, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processor 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Computer code for the operating system, the object-oriented programming system, and applications or programs (such as backup applications or database applications) are located on storage devices, such as HDD 226, and may be loaded into main memory 208 for execution by processor 206. The processes for illustrative embodiments of the present invention may be performed by processor 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Figure 3:
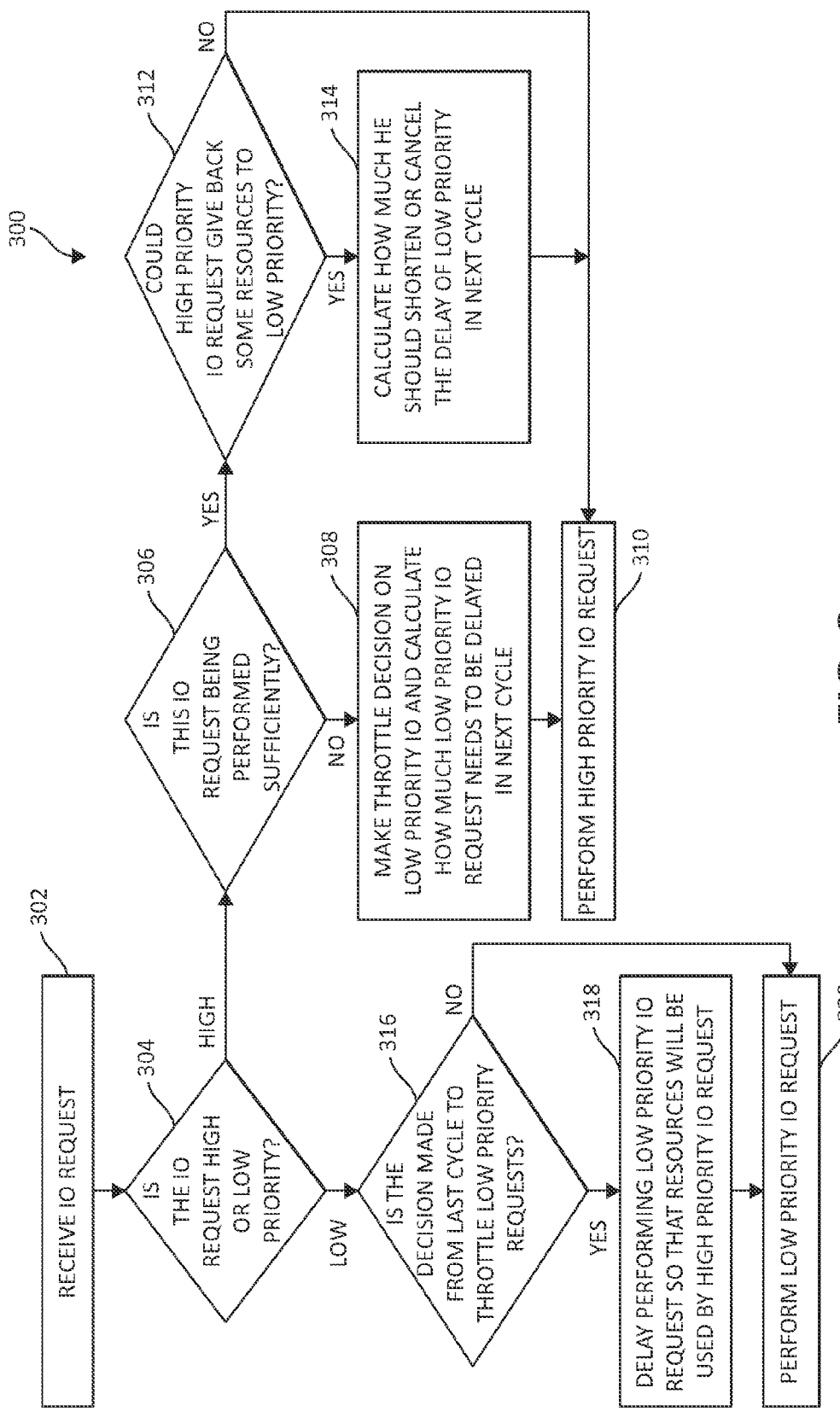
FIG. 3 is a flow diagram of a method of managing resources of a storage server, according to an embodiment.

FIG. 3 is a flow diagram of a method 300 of managing resources of a storage server, according to an embodiment. During operation of a data processing system (e.g., system 100 of FIG. 1), the storage server (e.g., storage server 108) may receive an input/output ("IO") request, block 302. For example, a host/server (e.g., host/server 104, 106) provides the IO request that is received by the storage server (e.g., storage server 108). It will be appreciated that IO requests are continuously provided during operation of the system. Thus, IO requests may be provided before or after the IO request referred to in block 302. IO requests provided before the IO request referred to in block 302 may be referred to as "previously-submitted IO requests," and those IO requests provided after the IO request referred to in block 302 may be referred to as "subsequent IO requests." A previously-submitted IO request may be referred to as a "first IO request," and the IO request referred to in block 304 may be referred to as a "second IO request." Additionally, the subsequent IO request can be referred to as a "third IO request." It will be appreciated that the ordinal numbers referencing the IO requests are used to illustrate when the IO requests occur relative to each other.

At block 304, a determination is made as to whether the IO request has a high priority or a low priority. For example, a calculation is made, based on a quality of service agreement, as to the priority of the IO request to dynamically assign a priority level to the IO request. As noted above, the IO request can be pre-assigned an initial priority level. After the calculation is made, the priority level can change to another priority level. In any case, when the storage server receives the IO request, the priority level of the IO request is provided to the storage server. In an example, the IO request may have a priority level that is higher or lower than a previously-submitted IO request. In another example, the IO request may have a priority level that is higher or lower than a subsequent IO request.

If the priority level is high, a determination is made as to whether the IO request is being performed sufficiently, block 306. In an embodiment, the determination is made by comparing the performance of the high priority IO request with the performance of a low priority IO request. In another embodiment, the determination is made by comparing the performance of the high priority IO request with previous attempts to perform the high priority IO request. In any case, to make such a determination, historical data related to the performance of the high priority IO request and/or low priority IO request is analyzed. For example, analysis of the historical data includes determining whether the performance level of the IO request has met or exceeded a target in previous runs of the IO request. The target can be a numerical value, in an embodiment. In another embodiment, the target can be a qualitative value, such as "satisfactory" or "unsatisfactory." In other embodiments, other targets are employed.

If the IO request is not being performed sufficiently, a decision is made to throttle a low priority IO request and a calculation is made as to how long the low priority IO request should be delayed, block 308. In an embodiment, the storage server concurrently waits to perform the high priority IO request, while the performance level of the high priority IO request does not meet or exceed the target. In another embodiment, the storage server concurrently waits to perform the high priority IO request, while the performance level of the high priority IO request compared to the performance level of the low priority IO request does not meet or exceed the target. After a subsequent low priority IO request is identified for throttling, resources are reallocated to performing the high priority IO request by the storage server. Specifically, at least a portion of the resources that would have been used for performing the low priority IO request are reallocated towards the high priority IO request of block 308. When a determination is made to throttle the low priority IO request, the throttled low priority IO request is not performed, in an embodiment. In another embodiment, the throttled low priority IO request is performed by applying limited resources. Consequently, the high priority IO request is performed using re-allocated resources in proportion to the limited resources directed towards performance of the low priority IO request. In any case, the high priority IO request is performed, block 310.

Returning to block 306, if the high priority IO request is being performed sufficiently, a determination is made as to whether resources can be allocated to perform the throttled low priority IO request, block 312. If so, a calculation is made as to how much of the delay of the throttled low priority IO request should be shortened or whether the delay should be canceled for the next performance cycle, block 314. Once calculated, the storage server then reallocates the resources to the performance of a subsequent the low priority IO request. The high priority IO request is performed, block 310. In an embodiment in which a determination is made that no resources can be allocated to perform the throttled low priority IO request, the system continues to block 310 to perform the high priority IO request.

At block 304, if the IO request is a low priority request, the method continues to block 316 to determine whether a decision had been made from a previous cycle to throttle low priority IO requests. If so, performance of the low priority IO request is delayed so that the resources can be allocated for the performance of the previously-submitted high priority IO request, block 318. For example, when the performance level of the high priority IO request does not meet or exceed a target or when the performance level of the high priority IO request compared to the performance level of the low priority IO request does not meet or exceed a target, at least a portion of a predetermined amount of the resources previously designated for performing the previously-submitted low priority IO request is re-allocated to performing the high priority IO request. After the high priority IO request is performed, the low priority IO request is then performed, block 320. If at block 316, a decision had not been made to throttle low priority IO request, the method continues to block 320 and the low priority IO request is performed.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, although a distributed system is depicted, a single system alternatively can be employed. In such embodiment, some of the hardware (such as the additional server) may not be included. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including host computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of managing resources of a storage server comprising:

receiving a first input/output (IO) request;

dynamically assigning a first priority level to the first IO request, the first IO request associated with a performance level for an application residing on a host in communication with the storage server;

throttling a second IO request of a second priority level for a calculated delay period to allow at least a portion of a predetermined amount of resources previously designated for performing the second IO request to be re-allocated to performing the first IO request, the second priority level being different than the first priority level;

determining whether a portion of the re-allocated resources can be used to perform the throttled second IO request, if the first IO request is being performed sufficiently;

calculating how much of the calculated delay period should be shortened for a next performance cycle, if the resources can be used; and reallocating the resources to the performance of the throttled second IO request for the next performance cycle after the calculation.

2. The method of claim 1, further comprising:
waiting to perform the first IO request, when the performance level of the first IO request does not meet or exceed the first target; and
performing the first IO request after the resources are re-allocated.

3. The method of claim 2, wherein the step of throttling the second IO request includes performing the second IO request with a limited portion of the predetermined amount of resources.

4. The method of claim 3, wherein the step of throttling the second IO request includes re-allocating resources to perform the first IO request in proportion to the limited portion of the predetermined amount of resources used to perform the second IO request.

5. The method of claim 2, wherein the step of throttling the second IO request includes performing the second IO request after the step of performing the first IO request.

6. The method of claim 1, further comprising:
performing the second IO request, when the performance level of the first IO request meets or exceeds a second target.

7. The method of claim 1, further comprising:
receiving a third input/output (IO) request,
dynamically assigning the third IO request with a third priority level that is higher than the first priority level; and
throttling the first IO request, when a performance level of the third IO request does not meet or exceed a third target to allow at least a portion of a predetermined amount of resources previously designated for performing the first IO request to be re-allocated to performing the third IO request.

8. The method of claim 7, wherein the first priority level is higher than the second priority level.

9. The method of claim 8, wherein the second priority level is lower than the third priority level.

10. The method of claim 1, wherein the step of throttling further comprises throttling the second IO request when the performance level of the first IO request does not meet or exceed a first target.

11. The method of claim 1, wherein the step of throttling further comprises throttling the second IO request when the performance level of the first IO request compared to the performance level of the second IO request does not meet or exceed a target.

12. A method of managing resources of a storage server comprising:
receiving a first input/output (IO) request;
dynamically assigning a first priority level to the first IO request, the first IO request associated with a performance level for an application residing on a host in communication with the storage server;
throttling a second IO request of a second priority level, when the performance level of the first IO request does not meet or exceed a first target or when the performance level of the high priority IO request compared to the performance level of the low priority IO request does not meet or exceed a target to allow at least a portion of a predetermined amount of resources previously designated for performing the second IO request to be re-allocated to performing the first IO request, the second priority level being lower than the first priority level;
performing the first IO request;
receiving a third IO request,
dynamically assigning the third IO request with a third priority level that is higher than the first priority level; and
throttling the first IO request, when a performance level of the third IO request does not meet or exceed a third target or when the performance level of the third IO request compared to the performance level of the first IO request does not meet or exceed a target to allow at least a portion of a predetermined amount of resources previously designated for performing the first IO request to be re-allocated to performing the third IO request.

13. A computer system comprising:
a host configured to provide input/output (IO) requests; and
a storage server in communication with the host and configured to receive the IO requests, the storage server including a processor configured:
to receive a first input/output (IO),
to dynamically assign a first priority level to the first IO request, the first IO request associated with a performance level for an application residing on a host in communication with the storage server,
to throttle a second IO request of a second priority level for a calculated delay period to allow at least a portion of a predetermined amount of resources previously designated for performing the second IO request to be re-allocated to performing the first IO request, the second priority level being different than the first priority level,
to determine whether a portion of the re-allocated resources can be used to perform the throttled second IO request, if the first IO request is being performed sufficiently,
to calculate how much of the calculated delay period should be shortened for a next performance cycle, if the resources can be used, and
to reallocate the resources to the performance of the throttled second IO request for the next performance cycle after the calculation.

14. The computer system of claim 13, wherein the processor is further configured to wait to perform the first IO request, when the performance level of the first IO request does not meet or exceed the first target, and to perform the first IO request after receiving the re-allocated resources.

15. The computer system of claim 13, wherein the processor is further configured to re-allocate resources to perform the first IO request in proportion to a limited portion of the predetermined amount of resources.

16. The computer system of claim 14, wherein the processor is further configured perform the second IO request, when the performance level of the first IO request meets or exceeds a second target.

17. A physical computer storage medium comprising a computer program product method for managing resources of a storage server, the physical computer storage medium comprising:
- computer code for receiving a first input/output (IO);
- computer code for dynamically assigning a first priority level to the first IO request, the first IO request associated with a performance level for an application residing on a host in communication with the storage server;
- computer code for throttling a second IO request of a second priority level for a calculated delay period to allow at least a portion of a predetermined amount of resources previously designated for performing the second IO request to be re-allocated to performing the first IO request, the second priority level being different than the first priority level;
- computer code for determining whether a portion of the re-allocated resources can be used to perform the throttled second IO request, if the first IO request is being performed sufficiently;
- computer code for calculating how much of the calculated delay period should be shortened for a next performance cycle, if the resources can be used; and
- computer code for reallocating the resources to the performance of the throttled second IO request for the next performance cycle after the calculation.

18. The physical computer storage medium of claim 17, further comprising:
- computer code for waiting to perform the first IO request, when the performance level of the first IO request does not meet or exceed the first target; and
- computer code for performing the first IO request after receiving the re-allocated resources.

19. The physical computer storage medium of claim 17, wherein the computer code for throttling the second IO request includes computer code for performing the second IO request with a limited portion of the predetermined amount of resources.

20. The physical computer storage medium of claim 19, wherein the computer code for throttling the second IO request includes computer code for re-allocating resources to perform the first IO request in proportion to the limited portion of the predetermined amount of resources used for performing the second IO request.

21. The physical computer storage medium of claim 18, further comprising computer code for performing the second IO request, when the performance level of the first IO request meets or exceeds a second target.

* * * * *